United States Patent [19]
Taka et al.

[11] Patent Number: 5,403,539
[45] Date of Patent: Apr. 4, 1995

[54] METHOD AND APPARATUS FOR MOLDING INFLATION FILM

[75] Inventors: Toshio Taka; Takeshi Onoda; Hisashi Hatano; Tomoaki Kobayashi; Terumitu Kotani, all of Kawasaki, Japan

[73] Assignee: Showa Denko K.K., Tokyo, Japan

[21] Appl. No.: 91,049

[22] Filed: Jul. 14, 1993

[30] Foreign Application Priority Data

Jul. 15, 1992 [JP] Japan .................................. 4-210890
Jul. 15, 1992 [JP] Japan .................................. 4-210891
Jul. 22, 1992 [JP] Japan .................................. 4-216406

[51] Int. Cl.$^6$ ............................................. B29C 55/28
[52] U.S. Cl. .................... 264/565; 264/566; 264/569; 425/72.1; 425/326.1
[58] Field of Search ............ 264/565, 566, 569; 425/72.1, 326.1

[56] References Cited

U.S. PATENT DOCUMENTS

| | | |
|---|---|---|
| 3,141,912 | 7/1964 | Goldman et al. |
| 3,819,790 | 6/1974 | North et al. .................. 264/565 |
| 4,330,501 | 5/1982 | Jones et al. ................ 425/72.1 |
| 4,472,343 | 9/1984 | Kawamura . |
| 4,473,527 | 9/1984 | Fujisaki et al. ............. 425/72.1 |
| 4,478,564 | 10/1984 | Shinmoto ................... 425/72.1 |
| 4,511,530 | 4/1985 | Olsson et al. ............... 264/565 |
| 4,606,879 | 8/1986 | Cerisano . |
| 4,624,823 | 11/1986 | Andureau et al. .......... 425/72.1 |
| 4,626,397 | 12/1986 | Bose ........................... 425/72.1 |
| 4,632,801 | 12/1986 | Dowd .......................... 425/72.1 |
| 4,820,471 | 4/1989 | van der Molen ............ 264/564 |
| 4,842,803 | 6/1989 | Bose et al. .................. 425/72.1 |
| 4,938,903 | 7/1990 | Schaeffer et al. .......... 264/565 |

FOREIGN PATENT DOCUMENTS

| | | |
|---|---|---|
| 0180029 | 5/1986 | European Pat. Off. . |
| 0213663 | 3/1987 | European Pat. Off. . |
| 0405916 | 1/1991 | European Pat. Off. . |
| 1262568 | 3/1968 | Germany . |
| 58-138619 | 8/1983 | Japan ........................ 264/569 |
| 59-42931 | 3/1984 | Japan ........................ 264/565 |
| 59-171620 | 9/1984 | Japan ........................ 264/569 |

OTHER PUBLICATIONS

Patent Abstracts of Japan, vol. 7, No. 71 (M202) (1216) 24 Mar. 1983.

*Primary Examiner*—Jeffery R. Thurlow
*Attorney, Agent, or Firm*—Sughrue, Mion, Zinn, Macpeak & Seas

[57] ABSTRACT

A method and apparatus for molding an inflation film even from a thermoplastic resin having a small melt tension, in which a melt resin bubble extruded from an extruder is molded, while controlling a resin temperature of the bubble to a certain temperature range by an air ring provided with a plurality of annular slits for blowing cooling air in a take-up direction of the melt resin bubble and provided at a position at which the melt resin bubble is remarkably expanded, after (a) cooling air is blown to a melt resin bubble from a first air ring provided at the proximity of a die outlet to cool said melt resin bubble; and, then, the bubble is either (i) brought into contact, on the inner surface thereof, with the surface of a stabilizer provided on a die surface, or (ii) is supported in a non-contact state through an air layer, while being taken up.

7 Claims, 5 Drawing Sheets

METHOD AND APPARATUS FOR MOLDING INFLATION FILM

BACKGROUND OF THE INVENTION

1. Field of the Invention

The present invention relates to a method and apparatus for molding an inflation film. More specifically, the present invention relates to a method and apparatus for molding an inflation film for producing a thermoplastic resin film having excellent transparency (i.e., haze, gloss and clarity) and high strength, at a high productivity, which is capable of molding, at a high molding rate, synthetic resins which have a small melt tension and hence have been believed difficult to mold into a long neck type bubble (i.e., a bubble shape of the type in which a bubble expansion position is considerably spaced apart from a die), such as ethylene copolymer resins such as linear low density polyethylene (hereinafter referred to as "LLDPE"), low density polyethylene (hereinafter referred to as "LDPE"), or high density polyethylene (hereinafter referred to as "HDPE"), ethylene-vinyl acetate copolymer resins and ethylene-acrylate-based monomer copolymer resins, polypropylene resins, polyamide resins, polyester resins, according to a long neck type inflation film molding method, whereby films having a high strength are provided.

2. Description of the Related Art

Many proposals have been made about the production methods of inflation films by an air cooling method. Among them, the shapes of resin bubbles for molding the film can be classified broadly into four or five types (See, for example, FIGS. 1 and 2, and FIGS. 9 and 10).

Factors which determine the shape of the melt resin bubble include, for example, a cooling capacity, a film take-up speed and a melt resin temperature. In the case of linear polyethylene having a high melt tension such as ultra-high molecular weight high density polyethylene (hereinafter referred to as "HMWHDPE"), film molding by a so-called "longneck" type bubble has been widely employed, and the resulting film is supplied in large quantities as a balance film having a high strength in the field of, for example, shopping bags.

According to this method, however, since the melt bubble is gradually cooled, a transparent film cannot be obtained.

On the other hand, LLDPE has an extremely low melt tension and the fluidizing characteristics thereof are remarkably different from those of HMWHDPE. Therefore, the stability of the bubble is low and it is difficult to shape the bubble into, for example, a long neck type shape. Generally, the bubble is molded in a bubble shape of the type shown in FIG. 9 or 10 (which is called a "low frost line type") or by a T-die method. This is also true in the case of other thermoplastic resins having a low melt tension.

According to this low frost line type production method of the inflation film, the melt bubble is quenched and hence, a transparent film can be obtained. However, this method involves the problems in that the stability of the bubble becomes low in the case of a high speed production, and variance of the thickness and width of the film is likely to occur due to swaying of the bubble. Furthermore, orientation becomes larger in a take-up direction when the film is produced at a high speed. Therefore, the strength of the film in a longitudinal direction (i.e., machine direction) increases, whereas the strength in a direction perpendicular thereto (i.e., transverse direction) is likely to be greatly decreased, and the balance of the strength is lost. Accordingly, the film is likely to be broken in the longitudinal direction and the take-up speed is difficult to be increased. Thus, the productivity is limited.

As mentioned above, in order to mold a film from a synthetic resin having a low melt tension by an inflation method, it has been heretofore necessary to either form a low frost line type bubble shape, which can be stably produced, although the take-up speed is low, or to employ a T-die method.

SUMMARY OF THE INVENTION

Accordingly, the objects of the present invention are to eliminate the disadvantages of the prior art and to provide a method and apparatus for molding a film by an air cooling inflation method, which can produce, at a high productivity, a film having excellent transparency (i.e., haze and clarity), even from a thermoplastic resin having a low melt tension, which can solve the unstability of a melt resin bubble with a long neck type molding, and which can remarkably stabilize the bubble.

Other objects and advantages of the present invention will become apparent from the following description.

In accordance with the present invention, there is provided a method for molding an inflation film of a thermoplastic resin comprising the steps of:
(a) blowing cooling air to a melt resin bubble from a first air ring provided at the proximity of a die outlet to cool the melt resin bubble;
(b) either (i) bringing the bubble into contact, on the inner surface thereof, with the surface of a stabilizer provided on a die surface, or (ii) supporting the bubble in a non-contact state through an air layer, while being taken up; and
(c) molding the bubble, while controlling a resin temperature of the bubble, to a temperature ranging from a melting point of the thermoplastic resin to a temperature higher by 110° C. than the melting point, at an inlet of a second air ring having a plurality of annular slits and provided at a position at which the melt resin bubble is drastically expanded.

In accordance with the present invention, there is also provided an apparatus for molding an inflation film of a thermoplastic synthetic resin, comprising:
an extruder; a circular die for inflation provided with a bubble stabilizer; and first and second air rings for cooling a melt resin bubble;
wherein the second air ring has a plurality of annular slits; and the annular slit has an air ring for blowing cooling air to a take-up direction of the melt resin bubble.

In accordance with the present invention, there is further provided an apparatus for molding an inflation film of a thermoplastic synthetic resin, comprising an extruder; a circular die for inflation provided with a bubble stabilizer; and first and second air rings for cooling a melt resin bubble; wherein there is further provided means for supplying a small amount of air to prevent the melt resin bubble from coming into contact with the stabilizer, the second air ring has a plurality of annular slits, and the annular slit blows cooling air to a take-up direction of the melt resin bubble.

In accordance with the present invention, there is still further provided a method for molding an inflation film of a thermoplastic synthetic resin comprising: bringing a melt resin bubble extruded from a die into contact, on the surface thereof, with a stabilizer, while being taken up; and blowing cooling air from an air ring having annular slits, provided at a position, at which the melt resin bubble is drastically expanded, to a take-up direction of the bubble; and molding the bubble while controlling a temperature of the melt resin bubble at the outlet of the air ring to a temperature ranging from a crystallization point of the thermoplastic resin to a temperature higher by 60° C. than the crystallization point.

In accordance with the present invention, there is still further provided an apparatus for molding an inflation film of a thermoplastic synthetic resin comprising: an extruder; a circular die for inflation provided with a bubble stabilizer; and an air ring, wherein the air ring provided at a position at which a melt resin bubble is drastically expanded has a plurality of annular slits, and the annular slits being provided for blowing out cooling air to a take-up direction of the melt resin bubble.

BRIEF DESCRIPTION OF THE DRAWINGS

The present invention will be better understood from the description set forth below with reference to the accompanying drawings, wherein.

DESCRIPTION OF THE PREFERRED EMBODIMENTS

The thermoplastic resins usable in the present invention include, for example, polyethylene resins such as LLDPE, HDPE, LDPE, etc.; copolymer resins between ethylene and radically polymerizable monomers such as ethylene-vinyl acetate copolymers, ethylene-acrylate copolymers, ethylene-methyl methacrylate copolymers, etc.; polypropylene resins, poly(vinyl chloride), resins; polyamide resins, polyester resins, and the mixtures thereof, even though they have a small melt tension. However, the thermoplastic resins having a higher molecular weight, which can provide a greater melt tension, have excellent bubble stability.

According to the present invention, since the bubble stability is high even in the case of LLDPE, the film can be taken up at a high speed during molding and the molded film has excellent transparency and strength, and the transparency thereof is comparable to that of a casting polypropylene film. Furthermore, the film according to the present invention can be used as a less expensive film usable at a low temperature.

The first and second embodiments of the present invention will be explained using LLDPE as a typical example of the thermoplastic resins, with reference to the accompanying drawings.

Figure 4:
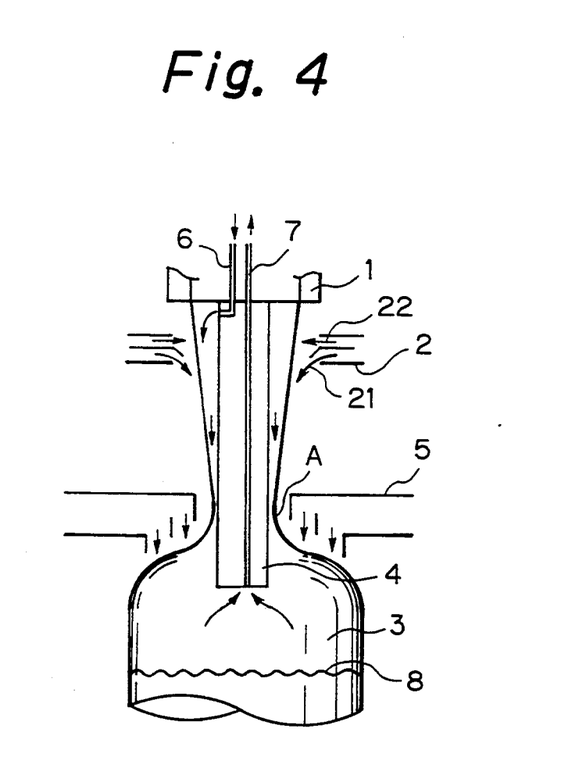
FIG. 4 is a schematic view showing an example of an inflation film molding method according to the second embodiment of the present invention.
Figure 5:
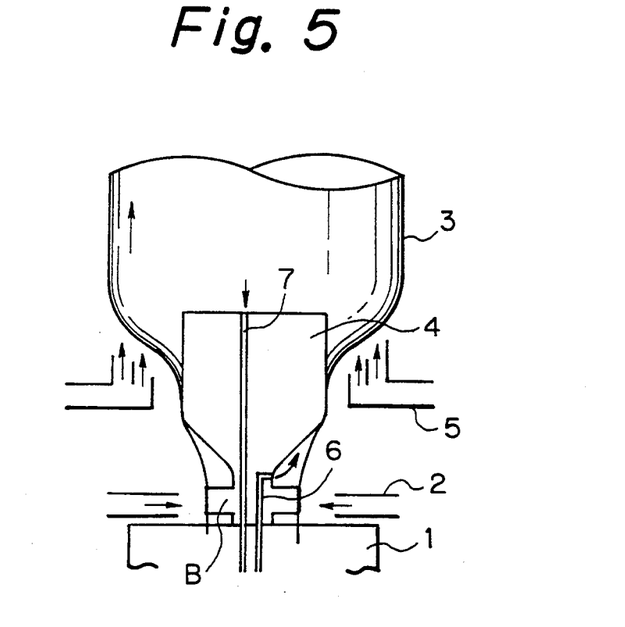
FIG. 5 is a schematic view showing another example of the inflation film molding method according to the second embodiment of the present invention, wherein a stabilizer diameter is greater than a die diameter.
Figure 6:
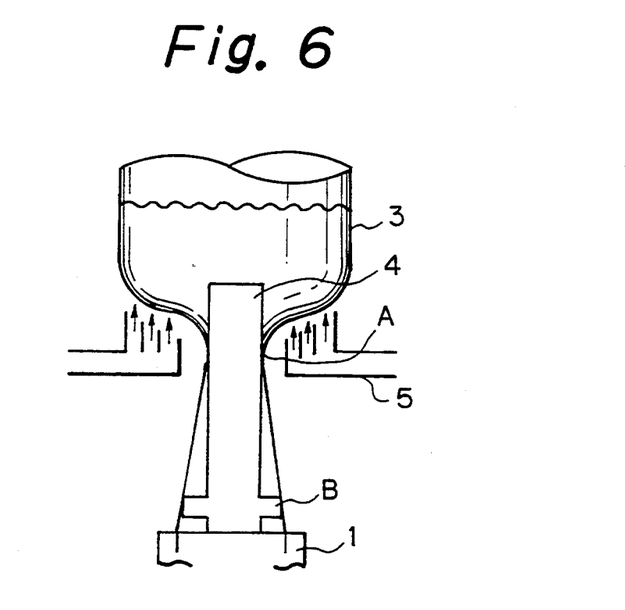
FIG. 6 is a schematic view showing an example of an inflation film molding method according to the third embodiment of the present invention.

The inflation molding method usable in the present invention may be either upward blowing (see FIG. 2) or downward blowing (see FIG. 4).

Although the extrusion temperature of the resin varies somewhat depending upon the kind of the resin, the temperature is generally within the range of a temperature higher by 40° C. than the melting point to a temperature higher by 120° C. than the melting point. In the case of LLDPE, for example, the molding is preferably carried out within the temperature range of 170° to 250° C.

When the temperature is lower than 170° C., the melt fracture is likely to occur and when the temperature is higher than 250° C., on the other hand, melt tension becomes smaller and the bubble stability is deteriorate.

Particularly, LLDPE or a resin composition containing LLDPE is likely to occur melt fracture. Therefore, the surface roughening can be avoided by setting a lip gap of a die to a range of 2.0 to 10.0 mm, preferably, 2.5 to 5.5 mm, which is greater than in the case of HDPE, or providing a bubble heater (not shown in the drawing) for heating the surface of a melt resin bubble 3 at an intermediate point, which is closer to the die side than an expansion point between a first air ring 2 and a second air ring 5. When the lip gap becomes greater than 7.0 mm, the uniformity of a film thickness is lost. Therefore, even though the melt fracture can be reduced by a greater lip gap, the lip gap should not be greater than 10.0 mm, as it is preferable to avoid skin roughening of the surface by the bubble heater.

The melt resin bubble 3 extruded at a relatively low temperature is cooled by cooling air from the first air ring 2 in the vicinity of the die outlet.

The blowing direction of the cooling air from the first air ring 2 may be oblique to the take-up direction in the same way as in the conventional air rings, but is preferably to a substantially horizontal direction.

Figure 1:
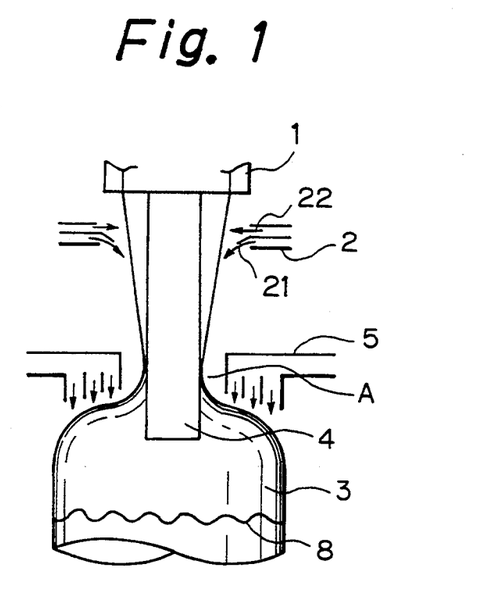
FIG. 1 is a schematic view showing an example of an inflation film molding method according to the first embodiment of the present invention.
Figure 2:
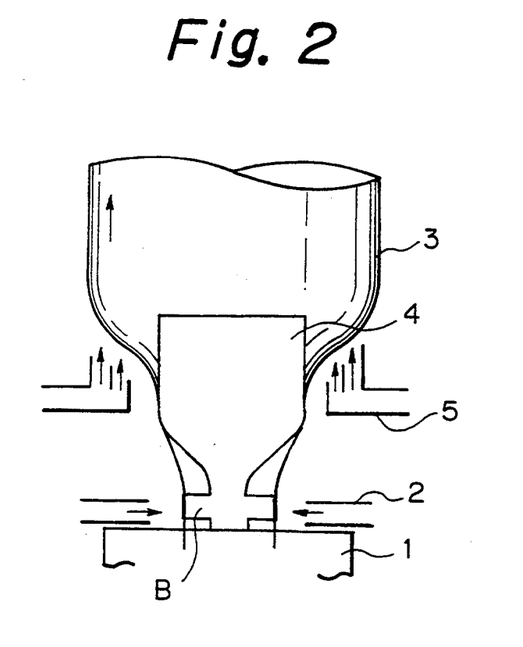
FIG. 2 is a schematic view showing another example of the inflation film molding method according to the first embodiment of the present invention, wherein a stabilizer diameter is greater than a die diameter.

Particularly, in the case of an air ring which blows out air obliquely to the take-up direction, it is preferred to use a first air ring equipped with a sub air outlet 22 for supplying a small amount of supplementary cooling air to compensate for a reduced pressure atmosphere to prevent the reduced pressure atmosphere generated by blow-out of the main cooling air from a main air outlet 21 from adversely affecting the melt resin bubbles 3, as shown in FIG. 1 or FIG. 4. Air for the sub air outlet may be the same air as air for the main outlet from the same air source, or the blow-out quantity may be controlled independently. However, the sufficient effect can be obtained, without the delicate control, because an allowable range is relatively large within the range in which the reduced pressure atmosphere does not adversely affect the melt resin bubbles 3.

It is advisable to provide an outlet internal stabilizer B having a diameter substantially equal to, or somewhat greater than, a slit diameter of the die 1, at a portion to which the cooling air is blown from this first air ring 2. The outlet stabilizer B may be constituted by, for example, a plate-like member, a net-like member or a spring, in order to reduce contact resistance as much as possible. When the outlet stabilizer B is provided, the bubble shape of the bubble can be retained by the outlet stabilizer B even when the blow-out pressure of the first air ring 2 is high, and this portion can be effectively stabilized.

According to the first embodiment of the present invention, the melt resin bubble is cooled by the first air ring, is taken up, while increasing the melt tension thereof and rapidly expands after it comes into contact with the stabilizer.

Preferably, the stabilizer generally has an outlet stabilizer on the die side thereof and furthermore, coaxially supports the internal stabilizer, etc., which is conventionally used for HDPE, at the downstream side of the outlet stabilizer. In this case, the melt resin bubble after leaving the outlet stabilizer forms a long neck type shape and tends to shrink as it is progressively spaced apart from the outlet stabilizer. Thus, the melt resin bubble comes into contact with the internal stabilizer and becomes stabilized. The diameter of the internal stabilizer is not specifically limited. In other words, it may be greater than the die diameter but preferably, it is smaller than the outlet stabilizer diameter and is generally 0.7 to 1.3 times, more preferably 0.7 to 1.0 times the diameter of the die. Even when a film having the same size is produced by using the die having the same size, a substantial expansion ratio (i.e., bubble diameter after expansion/bubble diameter before rapid expansion) can be increased.

According to the second embodiment of the present invention, to support the bubble in the non-contact state by the internal stabilizer 4 having the air layer on the surface thereof, a small amount of air is caused to continuously flow between the internal stabilizer and the bubble, generally to the take-up direction of the bubble. For example, an air inlet 6 is provided at the base portion of the internal stabilizer 4 while an air outlet 7 is provided at the top of the internal stabilizer, and air is caused to flow in such a manner that the internal pressure of the melt resin bubble can be controlled to a constant level. Thus, the bubble can be supported stably by the internal stabilizer 4 in the non-contact state. In this case, the surface of the internal stabilizer must be as flat as possible, so that the disturbance of the air flow can be minimized.

Although the diameter of the internal stabilizer 4 is not particularly limited, the diameter is preferably smaller than that of the outlet stabilizer B and is from 0.7 to 1.3 times, more preferably, from 0.7 to 1.0 times the die diameter. This is because a substantial expansion ratio (i.e., a ratio of the bubble diameter after expansion to the bubble diameter before expansion) can be increased even when the film having the same size is produced from the die 1 having the same size.

On the contrary, the second embodiment of the present invention demonstrates the merit in that a film having the same size and the same expansion ratio can be produced by using a die having a greater diameter.

When the substantial expansion ratio is increased, there can be obtained the effects that the strength in a transverse direction (i.e., a rectangular direction to the film take-up direction) can be increased and the impact strength can be increased, as well. The substantial expansion ratio is generally from 1.3 to 6.0 and, preferably, within the range of 1.5 to 4.5.

When the expansion ratio is substantially smaller than the value described above, a longitudinal rupture is likely to occur in the resulting film, and the impact strength drops. When the substantial expansion ratio is more than 6.0, on the other hand, the orientation in the transverse direction becomes too strong and slicing of the film is likely to occur, and cut-off of the bubble is also likely to occur during the production. Therefore, ratios this high should be avoided.

In the first embodiment of the present invention, a stabilizer for a HDPE balance film can also be used as the internal stabilizer according to the present invention, but it is preferred to use an internal stabilizer of the type which reduces the contact resistance, such as a stabilizer having a ball bearing or a barrel type roller buried at the contact position with the bubble, a stabilizer using a spring, a stabilizer equipped with a belt rotating in synchronism with the film in the film travelling direction, on the surface of the internal stabilizer, a stabilizer made of Teflon having a small frictional resistance, and so forth.

When the contact resistance between an internal stabilizer 4 and a melt resin bubble 3 is great, the cut-off of the bubble is likely to occur, because the melt tension remains at a low level even though it is increased. For this reason, the internal stabilizer 4 having a small contact resistance should be employed.

The melt resin bubble 3 is supported by the internal stabilizer 4 by an air layer during the production of the inflation film according to the second embodiment of the present invention. Therefore, the contact resistance at this portion is extremely small; hence, a stable high speed take-up operation becomes possible even in the case of the thermoplastic resin bubble having a small melt tension.

One of the important features of the first and second embodiments of the present invention is the temperature of the melt resin bubble. The melt resin bubble 3 extruded from the die 1 must be cooled by cooling air, etc., from the first air ring 2 and must remain within a temperature range which ranges from the melting point of the resin used to a temperature higher by 110° C. than the melting point, at the inlet of the second air ring 5. Preferably, the above-mentioned temperature is generally within the range of from (melting point+30° C.) to (melting point+80° C.) and more preferably, from (melting point+40° C.) to (melting point+80° C.). When this temperature is less than the melting point, the melt bubble is only gradually cooled, accordingly, and as a result, not only does transparency drop, but expansion becomes impossible or incomplete, so that the non-uniformity becomes large and a film having a desired thickness and size cannot be obtained. When the above-mentioned temperature is higher than the range mentioned above, the expansion of a melt resin bubble 3 becomes non-uniform and the stability of the bubble drops. Accordingly, the production of a film having uniformity becomes more difficult.

In the case of a straight-chain low-density polyethylene, for example, the resin temperature at the second air ring inlet should be within the range of 125° to 220° C. The melt resin bubble is sufficiently expanded inside the second air ring 5 or is sufficiently expanded immediately after it comes out from the second air ring 5, to form a film having a desired thickness (e.g., 10–150 μm, more preferably 10–80 μm) and size. When the high transparency is required, the film thickness is up to 50 μm and preferably, up to 40 μm. As the thickness of the film increases, cooling becomes more gradual, and the film unavoidably becomes opaque. This problem can be solved to a certain extent by using a bubble heater.

Figure 3:
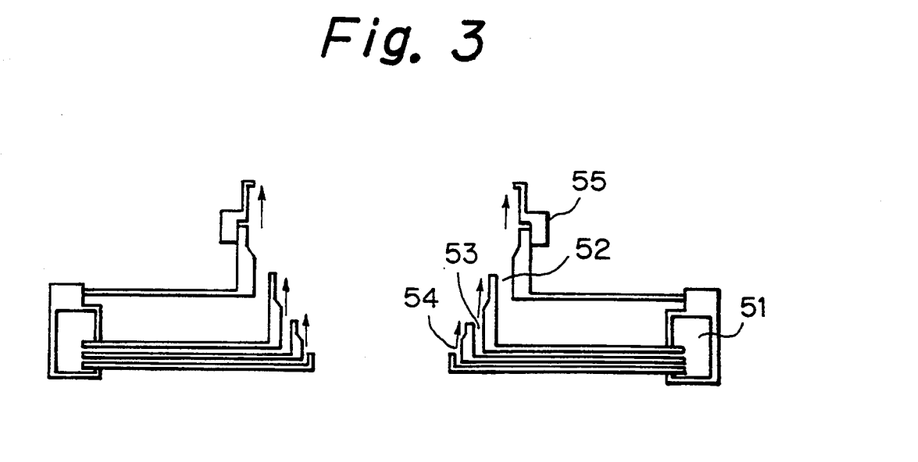
FIG. 3 is a sectional view showing an example of an air ring used in the present invention.

Plural air blowing outlets (52, 53, 54) of coaxial annular slit of the second air ring 5 for blowing at least two streams of cooling air may blow out the air to the outside of the bubble diameter, but if possible, air is preferably blown out in parallel with the bubble take-up direction as shown in FIG. 3.

The blowout of cooling air from the annular slits of the air ring in the bubble take-up direction generates a reduced pressure atmosphere. This reduced pressure atmosphere gives an influence on the melt resin bubble, and the drastic expansion of the bubble is started at this position.

Incidentally, although FIG. 3 shows triple annular slits of the air outlets (52, 53, 54) of the second air ring 5, but these may be at least double. The upper end wall surface of each air outlet 52, 53, 54 may be inclined so as to increase the degree of the reduced pressure, and a cover 55 may be fitted onto the tip of the air ring so as to also cut-off the flow of external air as well as the reduced pressure atmosphere from the outside.

The position of the frost line 8 that affects the properties of the resulting film can therefore be changed freely by the position of the second air ring 5. The position of the second air ring 5 must generally be spaced apart by at least 50 mm from the die surface, preferably, by at least 100 mm and more preferably, by at least 200 mm. When the second ring 5 is too close to the die surface, the cooling effect is decreased and the high speed take-up operation becomes difficult.

AS soon as the melt resin bubble 3 is drastically expanded, the resin film becomes thin, and is accordingly quenched. After it is solidified, air is squeezed by a nip roller in the same way as in the case of a conventional inflation method, and the film is taken up by a take-up machine to provide a product film.

The first and second embodiments of the present invention provide a production method which is effective not only for a thermoplastic resin having a high melt tension such as HMWHDPE for conventional balance films but also for those thermoplastic resins for which long neck type inflation molding has been believed to be difficult by a conventional inflation molding machine.

The reasons why the resin obtained by the method of the present invention has high transparency are assumed to be as follows.

Generally, the melt resin bubble extruded from the die expands at the outlet due to the swell effect, and the outer diameter of the melt resin bubble becomes greater by several to ten several percentage points than the die diameter, as is well known in the art.

When the bubble is expanded, the bubble surface shows large concavo-convex conditions. When the film molding is carried out in the bubble shape having a low frost line type shown in FIG. 9 or FIG. 10, the film is drastically expanded from this state and the film surface is strongly influenced by the swelling effect.

In the case of the long neck type, bubble shape, however, the melt resin bubble slowly moves towards the expansion point, the concavo-convex conditions on the surface thereof formed by swelling are drastically relaxed and the relaxed bubble is drastically expanded. Consequently, the influences caused by swelling can be reduced remarkably, and this is believed to be one of the factors for providing a film having a flatter surface.

Haze is known as one of the indices of transparency of films. The major proportion of the haze value of the film is existed in the external haze (i.e., opacity resulting from non-transmission of light due to concavo-convexities of the film surface) as is known in the art.

It is believed that the high transparency of the film according to the present invention is partially obtained from the long neck type bubble shape, which can relax the swelling effect.

When a neck point (i.e., a point immediately before the drastic expansion) is lowered to the crystallization point, the crystal grows and the haze is adversely affected. The present invention avoids this problem by limiting the temperature of the second air ring inlet, and this is believed to also contribute to the production of the high transparency film.

It is also believed that, according to the molding method of the present invention, the inflation molding can be satisfactory affected by controlling the melt resin bubble temperature at the inlet of the second air ring 5 by due to the cooling by the first air ring 2, and by the application of a method of drastical expanding of the melt resin bubble in the reduced pressure atmosphere generated by blow-out of the cooling air from a plurality of annular slits (52, 53, 54) of the second air ring, both for a resin having a high melt tension and even for a resin having a low melt tension.

Particularly, the melt resin bubble can be stabilized by supporting the same with the stabilizer in contact therewith in the first embodiment of the present invention or by supporting the same with the stabilizer, while non-contact therewith, in the second embodiment, and the high speed take-up operation becomes possible due also to the improvement in the cooling capacity due to the use of two stages of the air rings. Furthermore, due to the synergistic effect with quenching of the melt resin resulting from the drastic expansion, transparency such as the haze and image clarity can be remarkably improved.

AS mentioned above, in the film molding of the thermoplastic resin by the inflation method, the first and second embodiments of the present invention gradually cool the molten resin bubble by the first air ring provided at the vicinity of the die outlet; support it by the stabilizer in the contact state (i.e., the first embodiment) or support it by stabilizer, while in non-contact state with the surface of the stabilizer via the air layer (i.e., the second embodiment); control the temperature of the inlet of the second air ring having a plurality of annular slits to the range from the melting point of the thermoplastic resin to a temperature higher by 100° C. than the melting point; stabilize the melt resin bubble even in the case of the thermoplastic resin having a small melt tension such as LLD during a long neck type film molding; and can produce a film having excellent transparency (i.e., haze and clarity) at a high speed.

The molding apparatus used for this purpose can also be used suitably for the inflation film molding method mentioned above.

Furthermore, the present inventors found that, even in the case of those thermoplastic synthetic resins which are likely to undergo melt fracture, the haze and clarity can be drastically improved by producing the film by disposing the bubble heater between the first and second air rings.

Next, the third embodiment of the present invention will be explained with reference to drawings for the case of LLDPE as a typical example of the thermoplastic resins.

The inflation molding method usable for the present invention may be either upward blowing or downward blowing.

According to the third embodiment of the present invention, the resin extrusion temperature is relatively low because the air ring 5 in the vicinity of the die 1 does not exist. Although the extrusion temperature varies somewhat depending upon, the kind of the resin, it is within the range of from a temperature higher by 40° C. than the melting point to a temperature higher by 120° C. than the melting point, preferably within the range of from (melting point+40° C.) to (melting point+80° C.). In the case of LLDPE, for example, the molding is preferably carried out within the temperature range of from 170° C. to 210° C. When the temperature is less than 170° C., the melt fracture is likely to occur and when the temperature is more than 210° C., on the other hand, the melt tension becomes so small that the stability of the bubble 3 is likely to be deteriorated.

In this case, LLDPE or a resin composition containing LLDPE is likely to undergo the melt fracture when it is extruded at a low extrusion temperature, and the skin roughening of the surface can be avoided by increasing the lip gap of a die 1 to 2.0 to 10.0 mm (preferably, 2.5 to 5.5 mm), which is greater than that of the case of HDPE, or by disposing a bubble heater (not shown) for heating the surface of a melt resin bubble 3 at an intermediate point (on the die side with respect to the expansion point) between the die 1 and an air ring 5. The uniformity of the film thickness is lost with the increase in the lip gap from more than 7.0 mm. Therefore, even though the melt fracture can be reduced, the lip gap should not be increased beyond 10.0 mm, and the skin toughening of the surface is preferably avoided by the bubble heater.

The melt resin bubble 3 extruded at a relatively low temperature is taken up, while the inner surface thereof is kept in contact with a stabilizer 4. In this case, it is advisable to provide an outlet stabilizer B equal to, or somewhat greater than, the slit diameter of the die supported coaxially with a conventional internal stabilizer, on the die side of the internal stabilizer. To reduce the contact resistance as much as possible, the outlet stabilizer B may be constituted by a sheet- or net-like member, a spring, and so forth. When such an outlet stabilizer B exists, the bubble shape of the bubble 3 is retained by the outlet stabilizer B, and this portion can be further stabilized. The melt resin bubble 3 is taken up, and after coming into contact with the internal stabilizer 4, the bubble 3 is drastically expanded.

The stabilizer generally has the outlet stabilizer B on the die side, and more preferably has the internal stabilizer 4, which is conventionally used for HDPE, supported coaxially on the downstream side of the stabilizer B. In this case, the melt resin bubble 3 leaving the outlet stabilizer B assumes is the form of a long neck type shape, and as it comes off from the outlet stabilizer, it tends to shrink. Therefore, the melt resin bubble comes into contact with the internal stabilizer and becomes stabilized. The diameter of the internal stabilizer is not particularly limited, and may be greater than the die diameter but is preferably smaller than the outlet stabilizer and generally 0.7 to 1.3 times the die hole diameter. Thus, even when the film of the same size is produced by using a die having the same size, a substantial expansion ratio (i.e., bubble diameter after expansion/bubble diameter before expansion) can be increased. On the contrary, there can be obtained the merit in that a film having the same expansion ratio and having the same size can be produced by using a die having a greater diameter.

When this substantial expansion ratio is increased, there can be obtained the effects that the strength in the transverse direction (i.e., direction orthogonal to the film take-up direction) can be increased and the impact strength can be improved, as well. The substantial expansion ratio is generally within the range of 1.3 to 6.0 and preferably, within the range of 1.5 to 4.5.

When the expansion ratio is substantially smaller than this range, the resulting film is likely to undergo longitudinal rupture, and the impact strength also becomes lower. When the substantial expansion ratio is greater than 6.0, on the other hand, the orientation in the transverse direction becomes so excessive that slicing of the film is likely to occur and cut-off of the bubble is also likely to occur during the production. Therefore, these ranges should be avoided.

Although a stabilizer for any HDPE balance film can be used as the internal stabilizer 4, it is preferred to use an internal stabilizer of the type which reduces the contact resistance, such as a stabilizer having a ball bearing or a barrel type roller buried at the contact position with the bubble, a stabilizer using a spring, a stabilizer equipped with a belt rotating in synchronism in the film travelling direction on the surface of the internal stabilizer, and so forth.

When the contact resistance is large between the internal stabilizer 4 and the melt resin bubble 3, cut-off of the bubble is likely to occur because the improvement in the melt tension, although it is attained, is only at a limited level. Therefore, the internal stabilizer 4 having a smaller contact resistance should be employed.

The melt resin bubble temperature is one of the important factors in the present invention. The melt resin bubble 3 extruded from the die 1 at a relatively low temperature should be within a range from the crystallization point of the resin used to a temperature higher by 60° C. than the crystallization point, at the outlet of the air ring, and is preferably within the range of (crystallization point+10° C.) to (crystallization point+40° C.). When the melt resin bubble temperature is lower than the crystallization point, the melt bubble is only gradually cooled so that the transparency is decreased, and moreover, the expansion becomes impossible or incomplete. Accordingly, variance becomes large and a film having an intended thickness and size cannot be obtained. When the temperature is higher than the above-mentioned temperature range, the expansion of the melt resin bubble 3 becomes non-uniform and the stability of the bubble is deteriorated. Accordingly, the production of a uniform film becomes difficult. Generally, the crystallization point of the thermoplastic resins exist at a temperature lower by about 10° C. than the melting point thereof.

In the case of a linear low density polyethylene, for example, the resin temperature at the outlet of the air ring should be from the melting point of the thermoplastic resin to 180° C. (e.g., 120°–180° C.). The melt resin bubble is sufficiently expanded in the air ring, or is sufficiently expanded immediately after it comes out from the air ring, and is converted to a film having a predetermined thickness (e.g., 10–150 μm, more preferably 10–80 μm) and size. When the high transparency is required, the film thickness is not greater than 50 μm, preferably not greater than 40 μm. As the film thickness becomes larger, the film is cooled more gradually, so that the film unavoidably becomes opaque. This problem can be solved to a certain extent by the use of a bubble heater, as mentioned above.

Figure 7:
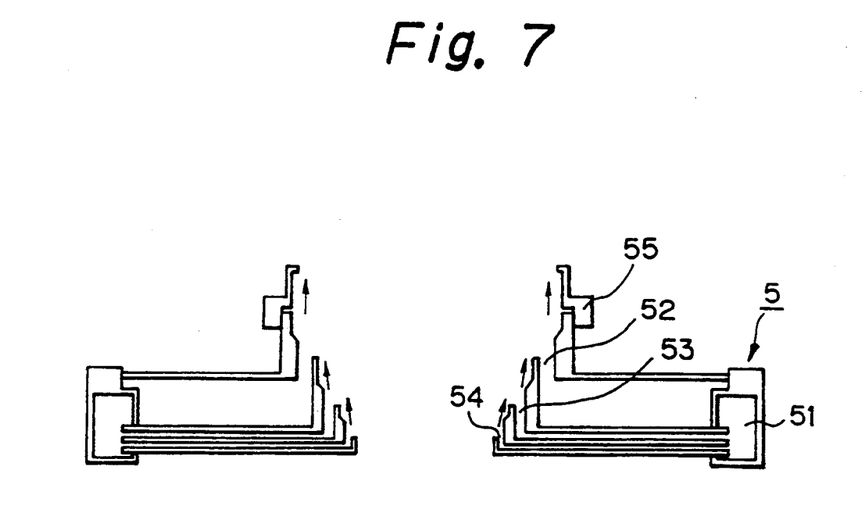
FIG. 7 is a sectional view showing an example of an air ring used in the third embodiment of the present invention.
Figure 8:
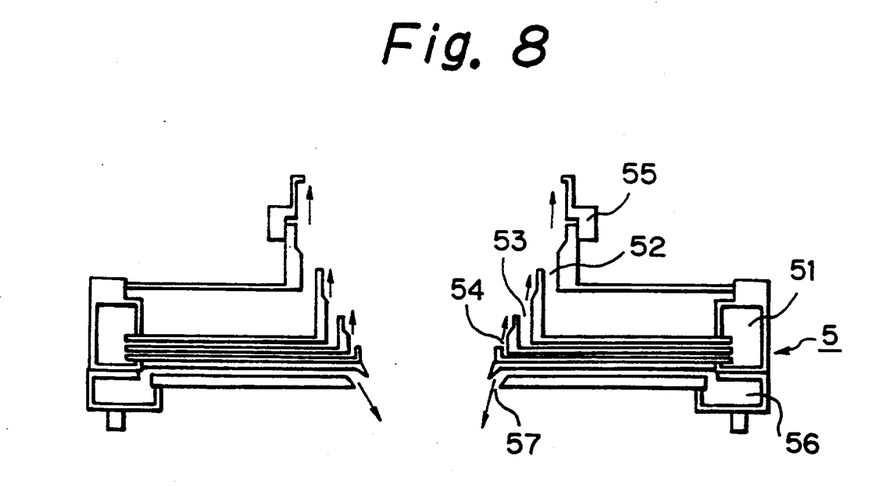
FIG. 8 is a sectional view showing another example of the air ring used in the third embodiment of the present invention.
Figure 9:
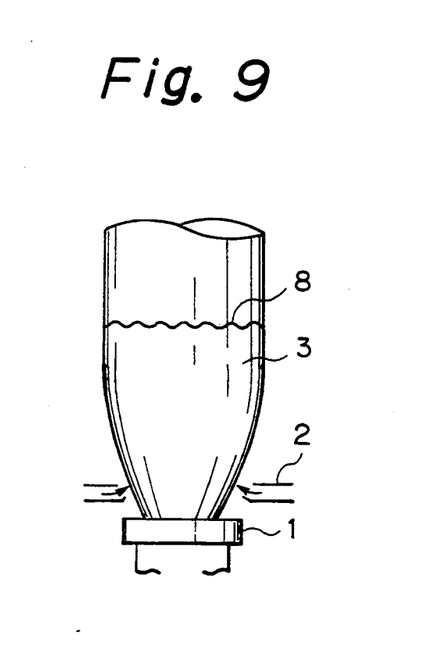
FIG. 9 is a schematic view showing an example of a low frost line type inflation film molding method according to the prior art.
Figure 10:
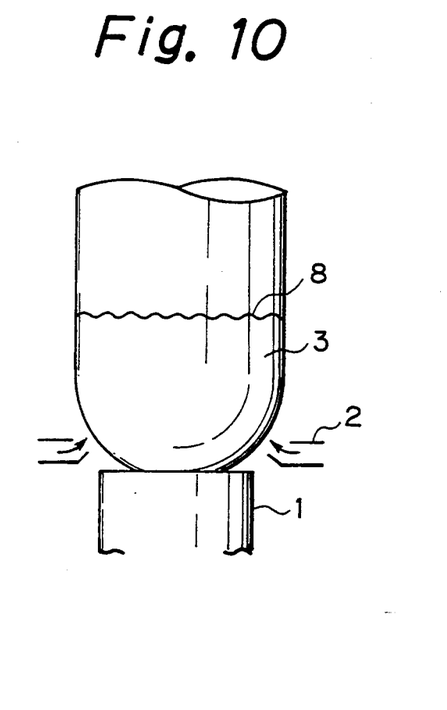
FIG. 10 is a schematic view showing another example of the low frost line type inflation film molding method according to the prior art.

The outlets of a plurality of annular slits (52, 53, 54) of the air ring having the concentric annular slits for blowing out at least two cooling air streams may blow out the air in the onward direction of the bubble diameter, but are preferably shaped in such a manner as to blow out the air in the direction substantially parallel to the bubble take-up direction as shown in FIG. 7 or FIG. 8.

The reduced pressure atmosphere which is generated by blow-out of the cooling air from the annular slits (52, 53, 54) of the air ring 5 affect the melt resin bubble, and the drastic expansion of the bubble starts to occur at this position.

FIG. 7 or FIG. 8 shows the cooling air outlets of the annular slits (52, 53, 54) of the air ring 5 in the triple annular slit structure, but this may be at least a double structure. The upper end wall surface of each air outlet of the annular slits (52, 53, 54) may be inclined so as to increase the degree of the reduced pressure atmosphere. A cover 55 may also be fitted to the tip of the air ring so as to cut-off the flow of external air and cut-off the reduced pressure atmosphere from the outside.

Accordingly, the position of the frost line, which affects the properties of the resulting film, can be changed freely by moving the position of the air ring 5. The position of the air ring 5 should generally be spaced apart by at least 50 mm from the die surface, preferably by at least 100 mm, and more preferably by at least 200 mm. The cooling effect is decreased when the distance is too close to the die surface.

To promote cooling of the melt resin bubble 3, it is also effective to use an air ring having outlets 57 (see FIG. 8) for cooling the melt resin bubble in the opposite direction (i.e., the melt resin bubble ranging from the die to the air ring) in addition to the outlets of a plurality of the annular slits (52, 53, 54) for the cooling air in the bubble take-up direction. This method can increase the extruded resin temperature, although to a limited extent, can somewhat relax the operation condition, and can improve productivity. The outlets 57 in the opposite direction are not limited, and cooling air can be blown to the melt resin bubble at an angle of from 45° to 60°.

When the melt resin bubble 3 is drastically expanded, the resin film becomes thin. Accordingly, the film is quenched. After the film is solidified, air is squeezed by nip rollers (not shown in the drawing) in the same way as in the conventional inflation, and the film is taken up by a take-up machine to provide a product film.

The present invention provides a production method which is effective for not only the thermoplastic resin having a high melt tension such as HMWHDPE for ordinary balance films, but also for those thermoplastic resins which have a low melt tension and for which long neck type inflation molding has been believed to be difficult.

The reasons why the film obtained according to the method of the present invention has high transparency are believed to be as follows.

Generally, the melt resin bubble extruded from the die expands at the outlet due to the swelling effect, and the outer diameter of the melt resin bubble becomes larger by several to ten several percentage points than the die diameter, as is well known in the art.

When the melt resin bubble expands due to the swelling effect, the bubble surface has a large number of concavo-convexities. When the film molding is carried out in the low frost line type bubble shape, shown in FIG. 9 or FIG. 10, the bubble is drastically expanded from that state. Accordingly, the film surface receives a strong influence from the swelling effect.

In the case of the long neck type bubble, however, the melt resin bubble slowly moves to the expansion point and in the mean time, the concavo-convexities generated on the surface due to the swelling effect are drastically relaxed, and since this relaxed bubble is drastically expanded, the influence from the swelling can be drastically reduced. This is believed to be one of the reasons why a film having a flatter surface can be obtained.

Haze is one of the indices of transparency of films. It is known that the major proportion of the haze value of a film consists mostly of external haze (i.e., opacity due to non-transmission of light due to concavo-convexities on the film surface).

It is believed that the high transparency of the film according to the present invention is partially brought forth by the long neck type bubble which relaxes the swelling effect.

When the neck point (i.e., the point immediately before drastic expansion) is lowered to the crystallization point, the crystal grows, and the haze is deteriorated. However, the present invention avoids this problem by controlling the temperature at the inlet of the air ring, and this is believed to be one of the factors for obtaining the high transparency film.

Although the reasons have not yet been sufficiently clarified, according to the molding method of the present invention, the inflation molding can be effected for not only resins having a high melt tension but also for resins having a low melt tension, without any practical problems, by controlling the temperature of the melt resin bubble at the outlets of the air ring 5, and by drastically expanding the melt resin bubble in the reduced pressure atmosphere generated by blow-out of the cooling air from a plurality of annular slits of the air ring.

In particular, because the melt resin bubble is brought into contact with the stabilizer, the melt resin bubble is stabilized, and optical characteristics such as haze, gloss, clarity, etc., can be remarkably improved by the synergistic effect obtained from quenching of the melt resin due to the drastic expansion.

In film molding of the thermoplastic resin by the inflation method, the present inventors found that even in the case of those thermoplastic resins having a low melt tension, such as LLDPE, the melt resin bubble can be stabilized and a film having excellent optical characteristics such as haze, gloss and clarity can be stably produced by supporting the melt resin bubble in contact state with the stabilizer, controlling the temperature of the outlets of the air ring having a plurality of annular slits provided at the position of the drastic expansion of the bubble to a temperature range from the crystallization point of the thermoplastic resin to a temperature higher by 60° C. than the crystallization point, and carrying out molding of the film by the long neck type molding method.

The molding apparatus used for this purpose can be suitably applied to the inflation film molding method as mentioned above.

Furthermore, the present inventors found that the haze, gloss and clarity can be drastically improved even in the case of the thermoplastic synthetic resins, which are likely to undergo the melt fracture, by disposing the bubble heater between the die and the air ring.

EXAMPLES

The present invention will now be further illustrated by, but is by no means limited to, the following Examples.

Example 1-1

A linear polyethylene having a density of 0.923 g/cm$^3$ and a melt flow rate (hereinafter referred to as "MFR") according to JIS K-7210, Table 1, Condition 4 of 1.0 g/10 min, was extruded at a resin temperature of 200° C., using an inflation film molding apparatus provided with a die having a lip gap of 3 mm and a diameter of 100 mm$\phi$.

A circular cylinder having the surface thereof coated with Teflon and having a diameter of 100 mm$\phi$ was used as the stabilizer, and a film having a lay-flat width of 314 mm and a thickness of 30 μm was molded at a take-up speed of 50 m/min. The melt resin bubble was cooled by cooling air, etc., from the first air ring. The melt resin temperature was 167° C. at the inlet of the second air ring consisting of double annular slits and was 131° C. at the outlet. The frost line was 650 mm from the die surface, and the frost line temperature was 111° C. Evaluation results of the resulting film are shown in Table 1-1.

The temperature of the second air ring inlet was measured at the nearest portion to the air ring by the use of an IR-AP thermometer, a product of Chino K. K., at a distance of 150 cm and a measurement area of a diameter of 45 mm$\phi$. The haze, gloss and clarity were measured by the methods according to JIS K-7105.

Examples 1-2 to 1-5

Molding of films were carried out using a resin composition consisting of 80 wt % of LLDPE having a density of 0.923 g/cm$^3$ and an MFR of 1.0 g/10 min and 20 wt % of LDPE having a density of 0.925 g/cm$^3$ and an MFR of 0.8 g/10 min and using the same apparatus as that of Example 1-1 but changing the molding condition. Evaluation results of the resulting films are shown in Table 1-1.

Example 1-6

Molding of a film was carried out using a resin composition consisting of 60 wt % of HDPE having a density of 0.953 g/cm$^3$ and an MFR of 0.5 g/10 min and 40 wt % of LDPE having a density of 0.925 g/cm$^3$ and an MFR of 0.8 g/10 min and using the same apparatus as that of Example 1-1 at a resin temperature of 200° C. and under the molding condition shown in Table 1-1. Evaluation results of the resulting film are shown in Table 1-1.

Example 1-7

Improvement in transparency was attempted in film molding of Example 1-4 by disposing a 3.0 kW infrared ray heater (i.e., bubble heater) at an intermediate portion between the first air ring and the second air ring. Evaluation results of the resulting film are shown in Table 1-1. Table 1-1 illustrates that the transparency (i.e., haze, gloss and clarity) could be remarkably improved.

Comparative Example 1-1

Molding of a film was carried out using the same resin and the same apparatus as those of Example 1-2 under the condition shown in Table 1-1. Transparency (i.e., haze, gloss and clarity) of the resulting film is remarkably decreased.

Comparative Examples 1-2 to 1-4

Inflation film molding of a low frost line type bubble (i.e., the bubble shape shown in FIG. 10 or FIG. 11), in which the melt resin bubble immediately expanded from the die outlets, was carried out using the same resin as that of Example 1-2. Evaluation results of the resulting film are shown in Table 1-1.

In Comparative Examples 1-2 and 1-3, the decrease in the transparency was not large, but even when the frost line in Comparative Example 1-3 was substantially the same as that of Example 1-1, the mechanical properties of the film are remarkably decreased. When the take-up speed was set to the same value of 50 m/min as in Examples 1-1, 1-2, 1-4 and 1-7, the melt resin bubble became unstable and the breakage occurred so frequently that the molding operation became impossible.

TABLE 1-1

| | Lip gap mm | AR2 inlet temp. °C. | Frost line Distance mm | Frost line Temp. °C. | BUR | Take-up speed m/min | Film Thickness μm | Haze % | Gloss % | Clarity % | Impact strength kg·cm/mm | Tear strength MD | Tear strength TD |
|---|---|---|---|---|---|---|---|---|---|---|---|---|---|
| Examples | | | | | | | | | | | | | |
| 1-1 | 3 | 167 | 650 | 111 | 2.0 | 50 | 30 | 4.4 | 119 | 71 | 219 | 8.2 | 230 |
| 1-2 | 3 | 172 | 850 | 111 | 2.5 | 50 | 30 | 5.4 | 112 | 69 | 218 | 11.0 | 168 |
| 1-3 | 3 | 172 | 850 | 111 | 2.0 | 65 | 30 | 4.9 | 117 | 72 | 204 | 9.0 | 215 |
| 1-4 | 3 | 170 | 950 | 110 | 1.5 | 50 | 50 | 6.5 | 111 | 67 | 193 | 13.0 | 217 |
| 1-5 | 5 | 152 | 790 | 112 | 2.0 | 50 | 30 | 4.9 | 118 | 72 | 232 | 6.0 | 227 |
| 1-6 | 3 | 193 | 690 | 121 | 2.0 | 50 | 30 | 4.0 | 123 | 68 | 189 | 25.6 | 193 |
| 1-7 | 3 | 190 | 980 | 111 | 1.5 | 50 | 50 | 3.7 | 127 | 74 | 198 | 13.8 | 218 |
| Comparative Examples | | | | | | | | | | | | | |
| 1-1 | 3 | 120 | 700 | 109 | 2.0 | 23 | 30 | 16.2 | 68 | 52 | 266 | 20.0 | 138 |
| 1-2 | 3 | not used | 350 | 111 | 2.0 | 30 | 30 | 4.9 | 120 | 73 | 210 | 6.5 | 181 |
| 1-3 | 3 | not used | 650 | 110 | 2.0 | 30 | 30 | 6.7 | 106 | 69 | 206 | 6.2 | 187 |
| 1-4 | 3 | not used | 350 | | 2.0 | 50 | molding was not possible | | | | | | |

Example 2-1

A linear polyethylene having a density of 0.923 g/cm³ and an MFR according to JIS K-7210, Table 1, Condition 4, of 1.0 g/10 min was extruded at a resin temperature of 200° C. using an inflation film molding apparatus provided with a lip gap of 3 mm and a diameter of 100 mm$\phi$.

A circular cylinder having the surface thereof coated with Teflon and having a diameter of 100 mm$\phi$ was used as the stabilizer, and a film having a lay-flat width of 314 mm and a thickness of 30 $\mu$m was molded at a take-up speed of 50 m/min, while the melt resin bubble was supported under the non-contact state and while a small amount of air was supplied from the base portion of the stabilizer. The melt resin bubble was cooled by cooling air, etc., from the first air ring. The temperature was 162° C. at the inlet of the second air ring consisting of a double annular slit, and the frost line was 620 mm from the die surface. Evaluation results of the resulting film are shown in Table 2-1.

The temperature at the inlet of the second air ring was measured at the nearest portion to the air ring by the use of an IR-AP thermometer, a product of Chino K. K., at a distance of 150 cm and a measurement area of a diameter of 45 mm$\phi$. The haze, gloss and clarity were measured by the method according to JIS K-7105.

Examples 2-2 to 2-5

Molding of films was carried out using a resin composition consisting of 80 wt % of LLDPE having a density of 0.923 g/cm³ and an MFR of 1.0 g/10 min and 20 wt % of LDPE having a density of 0.925 g/cm³ and an MFR of 0.8 g/10 min and the same apparatus as that of Example 2-1, but changing the molding condition. Evaluation results of the resulting films are shown in Table 2-1.

Example 2-6

Molding of a film was carried out using a resin composition consisting of 60 wt % of HDPE having a density of 0.953 g/cm³ and an MFR of 0.5 g/10 min and 40 wt % of LDPE having a density of 0.925 g/cm³ and an MFR of 0.8 g/10 min and the same apparatus as that of Example 2-1, at a resin temperature of 200° C. and under the molding condition shown in Table 2-1. Evaluation results of the resulting film are shown in Table 2-1.

Example 2-7

Improvement of transparency was attempted in molding of the film in Example 1-4 by disposing a 3.0 kW infrared heater (bubble heater) at an intermediate portion between the first air ring and the second air ring. Evaluation results of the resulting film are shown in Table 2-1. Table 2-1 illustrates that the transparency (haze, gloss and clarity) could be remarkably improved.

Comparative Example 2-1

Molding of a film was carried out using the same resin and the same apparatus as those of Example 2-2 under the condition shown in Table 2-1. The transparency (haze, gloss and clarity) of the resulting film was remarkably decreased.

Comparative Examples 2-2 to 2-4

Inflation film molding of a low frost line type (the bubble shape shown in FIG. 9 or FIG. 10 ), in which the melt resin bubble immediately expanded from the die outlet, was carried out using the same resin as that of Example 2-2. Evaluation results of the resulting films are shown in Table 2-1.

The decrease in the transparency was slight in Comparative Examples 2-2 and 2-3. When the frost line was made substantially the same as Examples of the invention such as in Comparative Example 2-3, however, the mechanical properties of the films are remarkably decreased. When the take-up speed was set to the same speed of 50 m/min as that of Examples 2-1, 2-2, 2-4 to 2-7, the bubble became unstable and breakage occurred so frequently that molding operation became impossible.

TABLE 2-1

| | Lip gap mm | AR2 inlet temp. °C. | Frost line Distance mm | Frost line Temp. °C. | BUR | Take-up speed m/min | Film Thickness $\mu$m | Haze % | Gloss % | Clarity % | Impact strength kg · cm/mm | Tear strength MD | Tear strength TD |
|---|---|---|---|---|---|---|---|---|---|---|---|---|---|
| Examples | | | | | | | | | | | | | |
| 2-1 | 3.0 | 162 | 620 | 111 | 2.0 | 50 | 30 | 4.1 | 121 | 74 | 226 | 10.5 | 187 |
| 2-2 | 3.0 | 168 | 780 | 111 | 2.5 | 50 | 30 | 4.6 | 117 | 72 | 228 | 12.1 | 165 |
| 2-3 | 3.0 | 171 | 820 | 111 | 2.0 | 65 | 30 | 4.6 | 119 | 73 | 219 | 9.8 | 196 |
| 2-4 | 3.0 | 168 | 900 | 110 | 1.5 | 50 | 50 | 6.5 | 114 | 69 | 208 | 14.5 | 228 |
| 2-5 | 5.0 | 143 | 710 | 111 | 2.0 | 50 | 30 | 4.6 | 122 | 74 | 239 | 9.5 | 195 |
| 2-6 | 3.0 | 195 | 680 | 121 | 2.0 | 50 | 30 | 4.1 | 121 | 68 | 185 | 23.8 | 195 |
| 2-7 | 3.0 | 190 | 920 | 111 | 1.5 | 50 | 50 | 3.8 | 126 | 71 | 215 | 15.2 | 231 |
| Comparative Examples | | | | | | | | | | | | | |
| 2-1 | 3.0 | 120 | 700 | 109 | 2.0 | 23 | 30 | 16.2 | 68 | 52 | 266 | 20.0 | 138 |
| 2-2 | 3.0 | — | 350 | 111 | 2.0 | 30 | 30 | 4.9 | 120 | 73 | 210 | 6.5 | 181 |
| 2-3 | 3.0 | — | 650 | 110 | 2.0 | 30 | 30 | 6.7 | 106 | 69 | 206 | 6.2 | 187 |
| 2-4 | 3.0 | — | 350 | — | 2.0 | 50 | molding was not possible | | | | | | |

Example 3-1

A linear polyethylene having a density of 0.923 g/cm³ and an MFR according to JIS K-7210, Table 1, Condition 4, of 1.0 g/10 min was extruded at a resin temperature of 200° C. using an inflation film molding apparatus provided with a lip gap of 3 mm and a diameter of 100 mm$\phi$.

A circular cylinder having the surface thereof coated with Teflon and having a diameter of 100 mm$\phi$ was used as the stabilizer, and a film having a lay-flat width of 314 mm and a thickness of 30 $\mu$m was molded at a take-up speed of 50 m/min. The melt resin bubble had a temperature of 130° C. at the outlets of the air ring consisting of double annular slits. The frost line was 650 mm from the die surface, and the frost line temperature was 111° C. Evaluation results of the resulting film are shown in Table 3-1.

The temperature at the inlet of the air ring was measured at the nearest portion to the air ring by an o IR-AP thermometer, a product of Chino K. K., at a distance of 150 cm and a measurement area of a diameter of 45 mm$\phi$. The haze, gloss and clarity were measured by the method according to JIS K-7105.

Examples 3-2 and 3-3

Molding of films was carried out using a resin composition consisting of 80 wt % of LLDPE having a density of 0.923 g/cm³ and an MFR of 1.0 g/10 min and 20 wt % of LDPE having a density of 0.925 g/cm³ and an MFR of 0.8 g/10 min and the same apparatus as that of Example 3-1 but changing the molding condition. Evaluation results of the resulting films are shown in Table 3-1.

Example 3-4

Improvement in transparency was attempted in film molding of Example 3-2 by changing the take-up speed to 30 m/min and disposing a 3.0 kW infrared heater (i.e., bubble heater) at an intermediate portion between the die and the air ring. Evaluation results of the resulting film are shown in Table 3-1. Table 3-1 illustrates that the transparency (haze, gloss and clarity) could be remarkably improved.

Example 3-5

Molding of a film was carried out using a resin composition consisting of 60 wt % of HDPE having a density of 0.953 g/cm³ and an MFR of 0.5 g/10 min and 40 wt % of LDPE having a density of 0.925 g/cm³ and an MFR of 0.8 g/10 min and the same apparatus as that of Example 3-1 at a resin temperature of 200° C. under the molding condition shown in Table 3-1. Evaluation results of the resulting film are shown in Table 3-1.

Comparative Example 3-1

Molding of a film was carried out using the same resin and the same apparatus as those of Example 3-2. The transparency (haze, gloss and clarity) of the resulting film was remarkably decreased.

Comparative Examples 3-2 to 3-4

Inflation film molding of a low frost line type (the bubble shape shown in FIG. 9 or 10), in which the melt resin bubble immediately expanded from the die outlet, was carried out using the same resin as that of Example 3-2. Evaluation results of the resulting films are shown in Table 3-1.

The decrease in the transparency was slight in Comparative Examples 3-2 and 3-3, but even when the frost line was set to be substantially the same as that of Example 3-1 such as in Comparative Example 3-3, the mechanical properties of the resulting films were remarkably decreased. In Comparative Example 3-4, when the take-up speed was changed to 50 m/min, while keeping the same bubble shape, the melt resin bubble became unstable and the breakage occurred so frequently that the molding operation became impossible.

TABLE 3-1

| | | AR2 | | | | Take-up | Film | | | | | | |
|---|---|---|---|---|---|---|---|---|---|---|---|---|---|
| | Lip | inlet | Frost line | | | speed | Thickness | Haze | Gloss | Clarity | Impact strength | Tear strength | |
| | gap | temp. | Distance | Temp. | | | | | | | | | |
| | mm | °C. | mm | °C. | BUR | m/min | μm | % | % | % | kg · cm/mm | MD | TD |
| Examples | | | | | | | | | | | | | | |
| 3-1 | 3 | 130 | 650 | 111 | 2.0 | 50 | 30 | 4.5 | 122 | 73 | 234 | 8.0 | 215 |
| 3-2 | 3 | 132 | 700 | 111 | 2.5 | 50 | 30 | 4.6 | 122 | 73 | 222 | 10.0 | 183 |
| 3-3 | 5 | 138 | 850 | 110 | 2.0 | 65 | 30 | 4.5 | 120 | 72 | 209 | 8.0 | 185 |
| 3-4 | 3 | 140 | 920 | 111 | 2.0 | 30 | 50 | 3.8 | 125 | 74 | 238 | 14.6 | 181 |
| 3-5 | 3 | 145 | 680 | 121 | 2.0 | 50 | 30 | 4.3 | 123 | 69 | 191 | 23.4 | 189 |
| Comparative Examples | | | | | | | | | | | | | | |
| 3-1 | 3 | 112 | 700 | 109 | 2.0 | 23 | 30 | 16.2 | 68 | 52 | 266 | 20.0 | 138 |
| 3-2 | 3 | not used | 350 | 111 | 2.0 | 30 | 30 | 4.9 | 120 | 73 | 210 | 6.5 | 181 |
| 3-3 | 3 | not used | 650 | 110 | 2.0 | 30 | 30 | 6.7 | 106 | 69 | 206 | 6.2 | 187 |
| 3-4 | 3 | not used | 350 | — | 2.0 | 50 | molding was not possible | | | | | | |

We claim:

1. A method for molding an inflation film of a thermoplastic resin comprising the steps of:
    (a) substantially horizontally blowing cooling air to a melt resin bubble from a first air ring provided at the proximity of a die outlet to cool said melt resin bubble;
    (b) either (i) bringing the bubble into contact, on the inner surface thereof, with the surface of a stabilizer provided on a die surface, said stabilizer is inside the inflation film as extruded, or (ii) supporting the bubble in a non-contact state through an air layer, while being taken up; and
    (c) molding the bubble, while controlling a resin temperature of said bubble, to a temperature ranging from a melting point of said thermoplastic resin to a temperature higher by 110° C. than said melting point, at an inlet of a second air ring having a plurality of annular slits and provided at a position downstream of the first air ring at which said melt resin bubble is drastically expanded.

2. A molding method as claimed in claim 1, wherein the thermoplastic resin having a low melt tension is molded by controlling an extruded resin temperature to a temperature ranging from a temperature higher by 40° C. than the melting point of the thermoplastic resin to a temperature higher by 120° C. than the melting point of the thermoplastic resin.

3. A molding method as claimed in claim 1, wherein a ratio of the diameter of the stabilizer coming into contact with the melt resin bubble to the die diameter is from 0.7 to 1.3, a substantial expansion ratio is from 1.3 to 6.0, and a distance from the die surface to the frost line is from 400 to 2,000 mm.

4. A molding method as claimed in claim 1, wherein the thermoplastic resin is a linear low density polyethylene, a lip gap is from 2.5 to 5.5 mm, the extruded resin temperature is from 17020 to 250° C., the resin temperature at the inlet of said second air ring is from 125° to 220° C., and the thickness of the film produced is from 10 to 150 μm.

5. An apparatus for molding an inflation film of a thermoplastic resin, comprising:

an extruder;

a circular die for inflation, provided with a bubble stabilizer, said stabilizer is inside the inflation film as extruded; and first and second air rings for cooling a melt resin bubble, said second air ring is provided at a position downstream from the first ring at which the melt resin bubble is drastically expanded;

said first air ring being provided with a slit for substantially horizontally blowing cooling air;

said second air ring being provided with a plurality of annular slits for blowing cooling air in a take-up direction of the melt resin bubble.

6. An apparatus as claimed in claim 5, further comprising:

means for supplying a small amount of air to prevent the melt resin bubble from coming into contact with the stabilizer.

7. An apparatus as claimed in claim 5, further comprising:

means for heating the surface of the melt resin bubble, disposed between the first air ring and the second air ring.

* * * * *